UNITED STATES PATENT OFFICE.

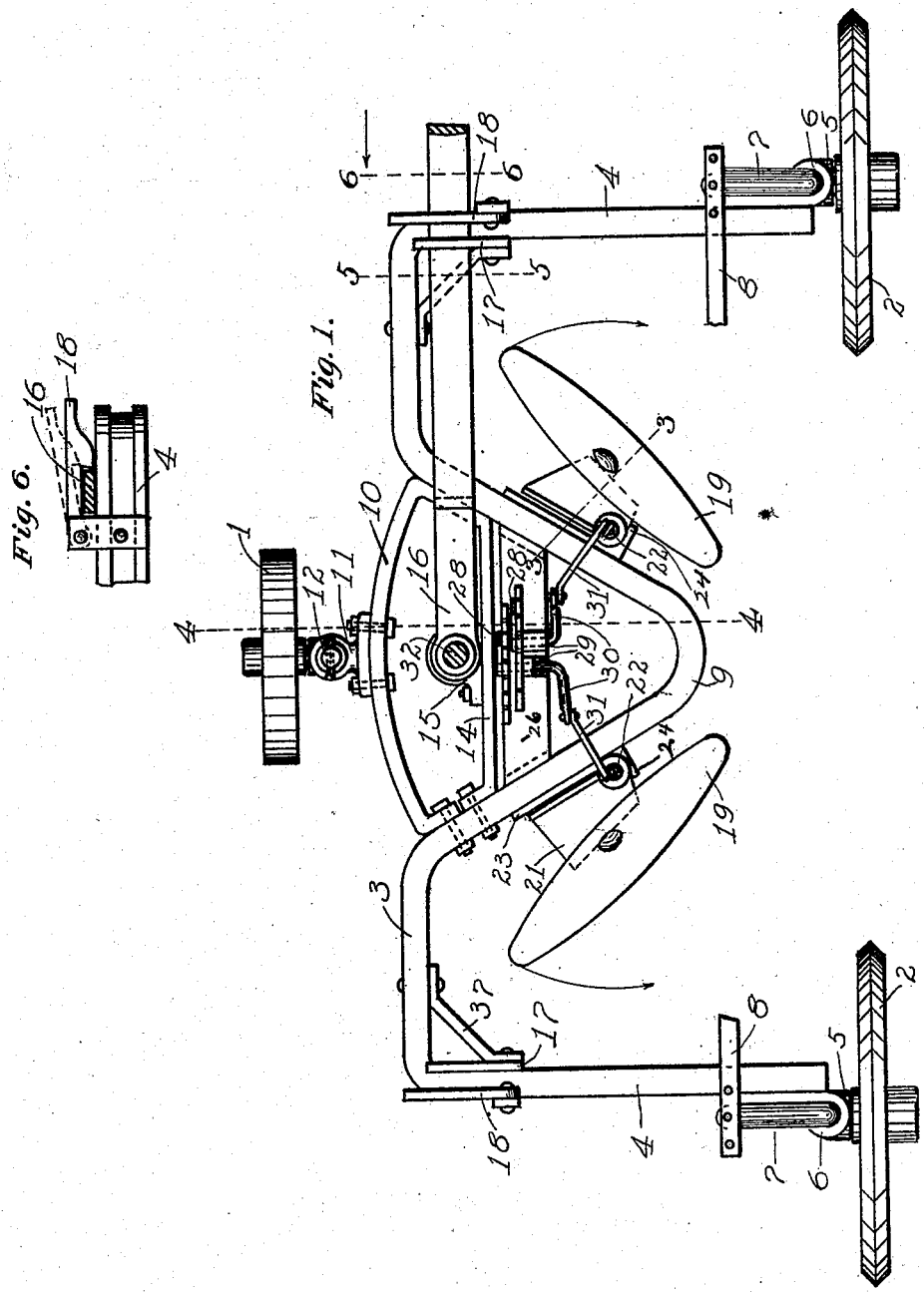

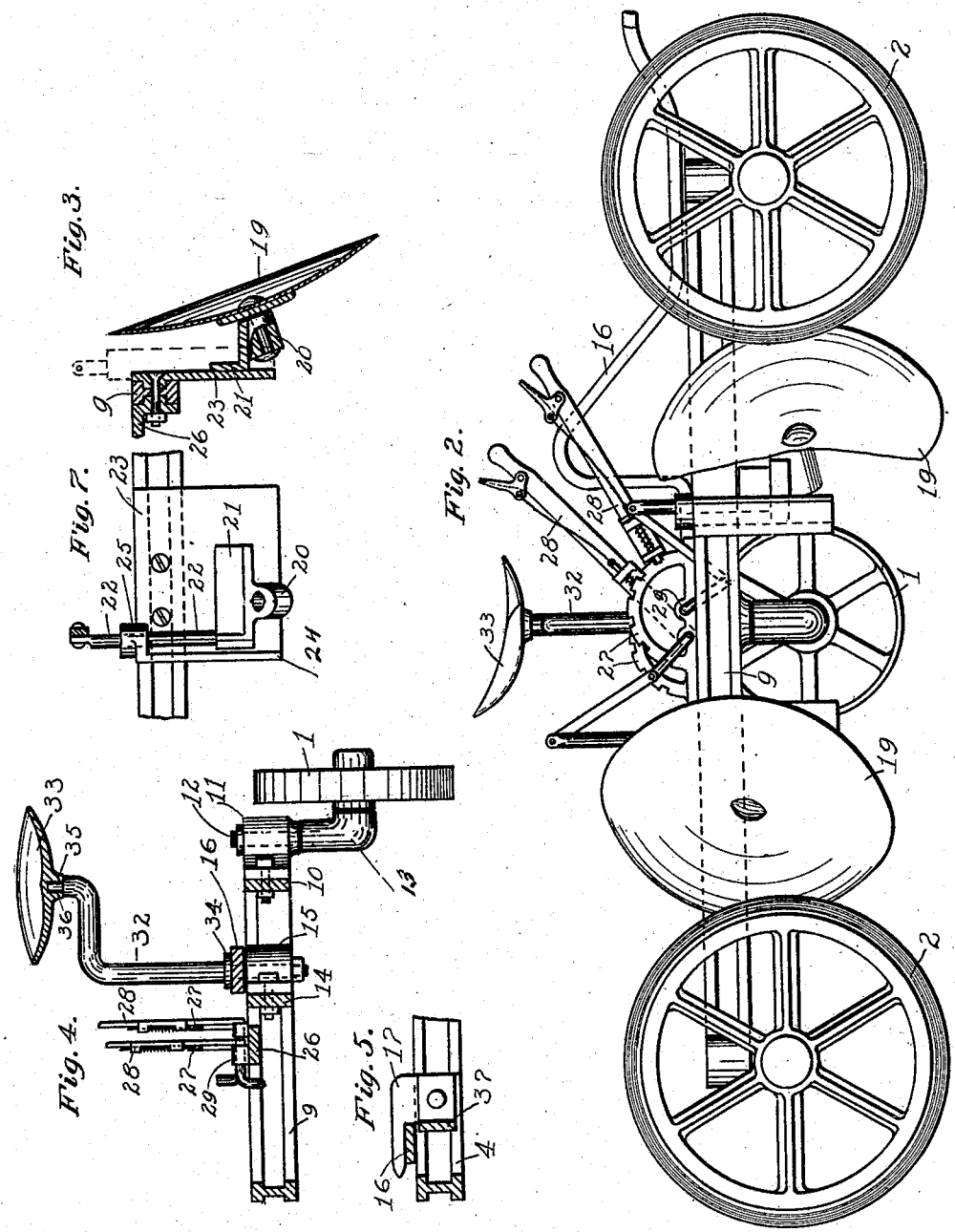

OTTO FISCHER, OF CHATTANOOGA, TENNESSEE, ASSIGNOR OF ONE-HALF TO JUDSON BUCHANAN, OF CHATTANOOGA, TENNESSEE.

PLOW.

No. 910,999.　　　　Specification of Letters Patent.　　　Patented Jan. 26, 1909.

Application filed October 24, 1906. Serial No. 340,248.

To all whom it may concern:

Be it known that I, OTTO FISCHER, a citizen of the United States, residing at Chattanooga, in the county of Hamilton and State of Tennessee, temporarily in the State of Washington, have invented a new and useful Improvement in Plows, of which the following is a specification, reference being had to the accompanying drawing.

My improvement relates to plows having revolving mold-boards, and particularly to side-hill or reversible rotary mold-board plows. Heretofore such plows have been made reversible by means of mechanism for reversing the direction of the mold-board, the latter being partially rotated upon an approximately upright axis.

In my improved plow, two rotary mold-boards are used, one facing in the proper direction to be operative when the plow is moved in one direction and the other standing in proper position for action when the plow moves in the opposite direction, and each being provided with mechanism for raising and lowering out of and into the ground.

In the accompanying drawings, Figure 1 is a plan of a plow embodying my improvement; Fig. 2 is a side elevation; Fig. 3 is a detail section on the line 3—3 of Fig. 1; Fig. 4 is a section on the line 4—4 of Fig. 1; Fig. 5 is a section on the line 5—5 of Fig. 1, looking toward the right; Fig. 6 is a section on the line 6—6 of Fig. 1, looking toward the left; Fig. 7 is a detail view of a bearing plate and fixed plate by means of which the disks are secured to the plow frame.

Referring to said drawings, 1 is the land wheel and 2, 2 are the furrow wheels ordinarily used in such plows. Said wheels constitute the carrying wheels of the plow. The beam, 3, has its ends, 4, turned laterally, and the furrow wheels, 2, are secured to said ends by means of crank-form axles, 5, resting in upright bearings, 6, and having horizontal arms, 7, to the free ends of which are coupled horizontal links or bars, 8, which lead to controlling levers of ordinary form and which are not shown in the drawings, for the reason that they are well known in this art and do not relate to the present invention.

The middle of the beam, 3, is bent laterally to the same side as are the ends, 4, to form a V-shape portion, 9, and a bridge-form piece, 10, extends horizontally across the open side of said V-shape portion, and to the middle of said bridge-form piece is secured a block, 11, having an upright aperture receiving the upright arm, 12, of the angle-form axle piece, 13, to which said land wheel, 1, is applied. Said arm, 12, may be held non-rotatable in said block, 11, or it may be rotatable to a limited extent, if so desired, so that the plane of said land wheel will automatically assume a slight inclination to an upright plane which is parallel to the line of draft. But, as such adjustability of said wheel is known in the art and does not constitute a part of the present invention, I deem it unnecessary to describe such construction in detail. Within said V-shape portion, 9, is an inner bridge-piece, 14, which is parallel to the line of draft, and to the middle of said bridge-piece, 14, is secured a block, 15, to which is hinged the inner end of a tongue, 16. To each lateral portion of the beam, 4, is applied a stop, 17, and a latch, 18, which constitute locking mechanism by means of which the tongue may be secured in either of two positions parallel to the line of draft. When the tongue is secured in one of said positions by one of said locking devices, the plow is adapted to be drawn in the direction of the free end of said tongue, and when said tongue has been released and turned horizontally upon its pivot through half a circle and secured by the other of said locking devices, the plow is adapted to be drawn in the opposite direction.

Two revolving mold-boards or disks, 19, 19, are applied to the outer oblique faces of the V-shape portion, 9, of the beam in such manner as to permit bodily upward and downward movement. Each such disk is journaled in a bearing, 20, which bearing is supported by a plate, 21, and said plate is secured to an upright reciprocatory shaft 22, at the upright edge of the said plate which is the nearer the furrow wheels. To the outer face of the V-shape portion of the beam is immovably affixed an upright plate, 23, having along its upright edge which is the nearer the furrow wheels a flange, 24, extending over the adjacent edge of the bearing plate, 21. Mounted upon the fixed plate, 23, is an upright bearing, 25, through which rises the shaft, 22. Within the V-shape portion of the beam is a third bridge-piece, 26, upon which are mounted two segmental racks, 27; and to each of such racks is applied a rack lever, 28. Adjacent to and axially in line with each such rack is a horizontal bearing, 29, in which rests the horizontal arm of a crank, 30, the inner end of said arm being attached rigidly to the adjacent rack lever, 28. To the outer end of the other arm of said crank is coupled one end of a link, 31, and said link rises thence and has its other end loosely coupled to the upper end of the upright shaft, 22.

From the foregoing it will be understood that the reciprocation of either rack lever, 28, will effect the raising and lowering of the corresponding disk, and that by setting said rack lever in different positions, said disk may be secured at different elevations. In the operation of the plow, the disk which is adjacent the tongue (as the latter is then set) is lowered sufficiently to make the desired cut, while the other of said disks is raised sufficiently to clear the ground while the then forward disk is making its cut. When the end of the field is reached and the tongue is reversed for the return trip, these positions of the disks are reversed.

A rigid seat-post, 32, supports a seat, 33. Said post rises from the block, 15, and is loosely surrounded by the tongue, 16, so that said post forms the journal for said tongue.
Above said tongue a collar or similar stop, 34, is secured to the seat-post so as to prevent the tongue from moving upward. The upper portion of the seat-post is bent laterally toward the land side of the plow and then upward, so that said seat is at a convenient distance from the rack levers, 28. The upper end of said post has an upright journal, 35, which enters the corresponding bearing, 36, whereby the seat is made rotatable in a horizontal plane, so that said seat may be reversed when the tongue is reversed.

The beam, 3, is rendered more rigid by means of the bridge-pieces, 10, 14, and 26. The beam may be further strengthened by means of braces, 37, placed into the angles between the main portion of the beam and the beam ends, 4. The beam, said bridge-pieces, and said braces, 37, together constitute the frame of the plow.
When one of the disks is cutting, the ground presses it toward the adjacent portion of the beam and the adjacent fixed plate, 23, so that the bearing plate, 21, is pressed against said fixed plate. Thus said disk retains its proper position, notwithstanding the fact that its bearing plate is hinged on an upright axis by means of the shaft, 22, the link, 31, being coupled loosely so as to permit a limited rotation of said shaft. This construction leaves the disk free to "trail" when it is the rear disk and is by accident low enough to be engaged by the ground. And as each disk is the rear disk during the plowing of alternate furrows the disks trail alternately.

I claim as my invention:

1. In a rotary mold-board plow, the combination with carrying wheels and a frame adapted for two-way draft, of two disks in a line parallel to the draft line and directed oppositely away from each other for two-way draft and adjustable in upright lines, substantially as described.

2. In a rotary mold-board plow, the combination with carrying wheels and a frame adapted for two-way draft, of two disks in a line parallel to the draft line and directed oppositely away from each other and adjustable in upright lines, and mechanism for securing said disks at different elevations, substantially as described.

3. In a rotary mold-board plow, the combination with carrying wheels and a frame, and a reversible tongue, of two disks in a line parallel to the draft line and directed oppositely away from each other and adjustable in upright lines, substantially as described.

4. In a rotary mold-board plow, the combination with carrying wheels and a frame adapted for two-way draft, of two disks in a line parallel to the draft line and directed oppositely away from each other for two-way draft and adjustable in upright lines, and mechanism for raising and lowering and securing said disks at different elevations, substantially as described.

5. In a rotary mold-board plow, the combination with carrying wheels and a frame adapted for two-way draft, of two disks in a line parallel to the draft line and directed positely away from each other for two-way draft and adjustable in upright lines, and a rack and lever lifting mechanism in operative relation with each of said disks, substantially as described.

6. In a rotary mold-board plow, the combination with carrying wheels and a frame adapted for two-way draft, of two disks in a line parallel to the draft line and directed oppositely away from each other for two-way draft, and members adjustable in upright lines supporting said disks, substantially as described.

7. In a rotary mold-board plow, the combination with carrying wheels and a frame, of two disks directed oppositely in a line parallel to the draft line, and vertically adjustable and partially rotatable members supporting said disks, substantially as described.

8. In a rotary mold-board plow, the combination with carrying wheels, and a frame, of two disks directed oppositely in a line parallel to the draft line, vertically adjustable and partially rotatable members supporting said disks, and mechanism for raising and lowering and securing said members at different elevations, substantially as described.

9. In a rotary mold-board plow, the combination with carrying wheels and a frame adapted for two-way draft, of two disks which are oppositely directed, vertically adjustable, and supported for alternately trailing.

10. In a rotary mold-board plow, the combination with carrying wheels and a frame adapted for two-way draft, of two disks which are oppositely directed, vertically adjustable, and supported for alternately trailing, and mechanism for raising and lowering and securing said disks at different elevations.

11. In a rotary mold-board plow, the combination with carrying wheels and a beam having a middle V-shape portion, of two disks directed oppositely and vertically adjustable upon said V-shape portion, substantially as described.

12. In a rotary mold-board plow, the combination with carrying wheels and a beam having a middle V-shape portion, of two disks directed oppositely and vertically adjustable upon said V-shape portion, and mechanism for securing said disks at different elevations, substantially as described.

13. In a rotary mold-board plow, the combination with a beam having a middle V-shape portion, of a bridge-piece, and a land wheel secured to said bridge-piece, substantially as described.

14. In a rotary mold-board plow, the combination with carrying wheels and a frame adapted for two-way draft, of a seat post, a reversible tongue, locking mechanisms for securing said tongue in its two positions, and disks directed oppositely for two-way draft, substantially as described.

15. In a rotary mold-board plow, the combination with carrying wheels and a frame adapted for two-way draft, of a seat-post, a tongue loosely surrounding said post, locking mechanisms for securing said tongue in two positions and two disks directed oppositely for two-way draft, substantially as described.

16. In a rotary mold-board plow, the combination with carrying wheels and a frame adapted for two-way draft, of two disks in a line parallel to the draft line directed oppositely for two-way draft, each disk being journaled to a bearing plate, upright fixed plates applied to said frame, and means for securing said bearing plates in position for upright adjustment with reference to said fixed plates, substantially as described.

17. In a rotary mold-board plow, the combination with carrying wheels and a frame, of two disks directed oppositely, each disk being journaled to a bearing plate, upright fixed plates applied to said frame, and means for securing said bearing plates in position for upright adjustment and partial rotation with reference to said fixed plates, substantially as described.

18. In a rotary mold-board plow, the combination with carrying wheels and a frame adapted for two-way draft, of two disks in a line parallel to the draft line directed oppositely for two-way draft, each disk being journaled to a bearing plate, upright fixed plates plied to said frame, means for securing said bearing plates in position for upright adjustment with reference to said fixed plates, and mechanism for raising and lowering and securing said bearing plates at different elevations, substantially as described.

19. In a rotary mold-board plow, the combination with carrying wheels and a frame, of two disks directed oppositely, each disk being journaled to a bearing plate, upright fixed plates applied to said frame, means for securing said bearing plates in position for upright adjustment and partial rotation with reference to said fixed plates, and mechanism for raising and lowering and securing said bearing plates at different elevations, substantially as described.

20. In a rotary mold-board plow, the combination with carrying wheels and a frame having a middle, laterally-directed portion, of two disks in a line parallel to the draft line and directed oppositely and vertically adjustable upon said laterally-directed portion, and raising and lowering mechanism in operative relation with said disks, substantially as described.

In testimony whereof I have signed my name, in presence of two witnesses, this eighth day of October, in the year one thousand nine hundred and six.

OTTO FISCHER.

Witnesses:
W. H. BEARD,
MABEL E. BEARD.